March 3, 1953     P. HALPERT     2,630,282
AIRCRAFT AUTOMATIC PILOT TURN CONTROL SYSTEM
Filed Sept. 10, 1948
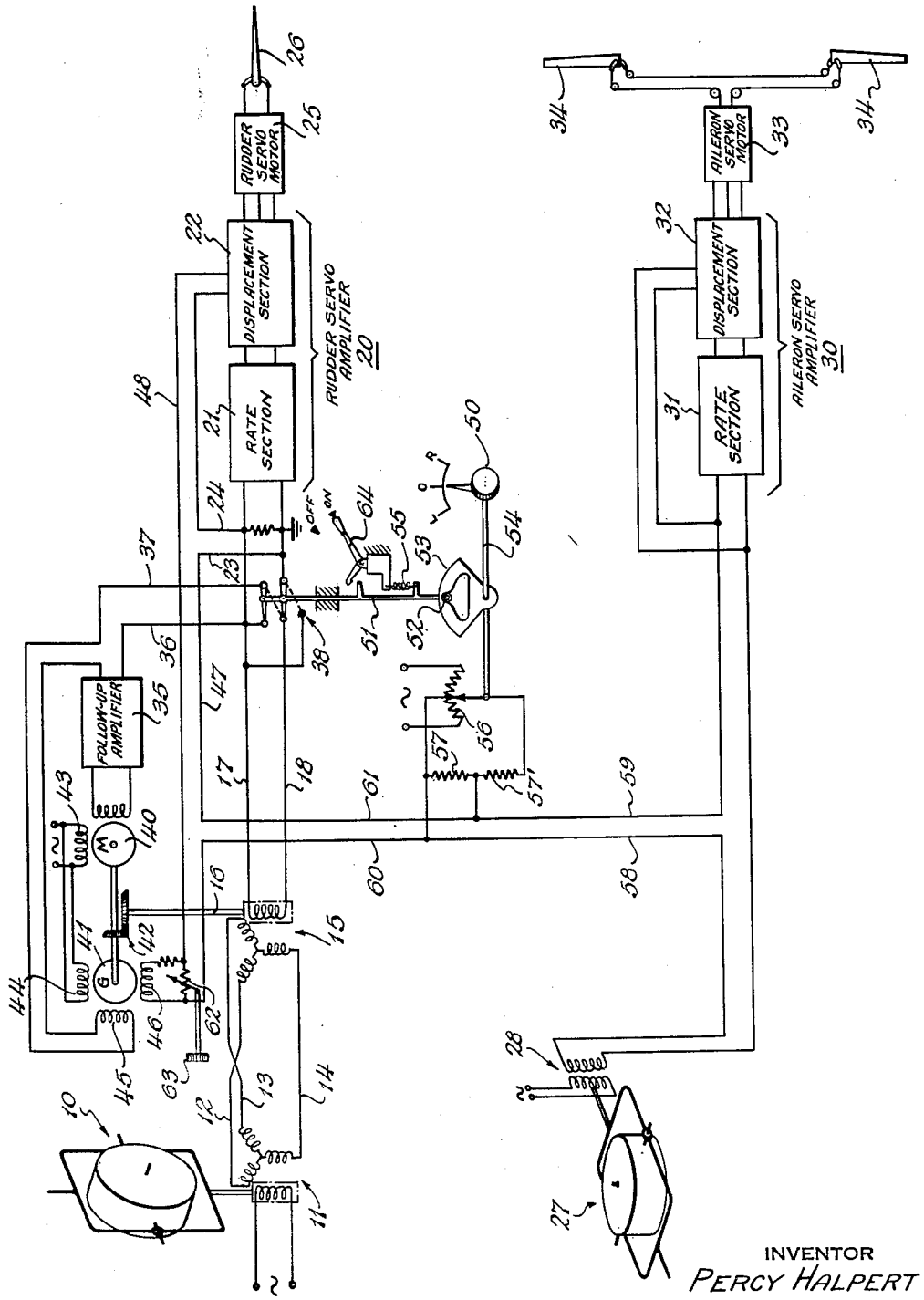
INVENTOR
PERCY HALPERT
BY
Herbert H. Thompson
his ATTORNEY Patented Mar. 3, 1953

2,630,282

UNITED STATES PATENT OFFICE 2,630,282

AIRCRAFT AUTOMATIC PILOT TURN CONTROL SYSTEM

Percy Halpert, Hempstead, N. Y., assignor to The Sperry Corporation, Great Neck, N. Y., a corporation of Delaware Application September 10, 1948, Serial No. 48,670

8 Claims. (Cl. 244—77)

1

The present invention relates to automatic pilots for aircraft and particularly pertains to apparatus of this character for causing turns of the craft at stabilized rates. In the improved system, means are employed to measure the rate of turn of the craft about its vertical axis and compare this measurement with a predetermined or desired rate of turn. When the actual and desired rates differ a signal is provided that is employed to operate the steering servomotor of the automatic pilot in a corrective sense.

Heretofore in some automatic pilot systems the pick-off associated with the directional gyro or azimuth reference of the arrangement has been rotated at 180 degrees per minute or other desired turn rate and the signal obtained operates the rudder servomotor to cause the craft to turn so that the craft follows the pick-off. The rudder is actuated when and if the azimuth of the aircraft and the pick-off are not in agreement. In other words, in this type of system the rudder is not necessarily actuated upon departure of the craft from a predetermined rate of turn. When and if the craft and pick-off have the same direction in azimuth, the rudder servomotor will not be actuated even though the rate of turn may be incorrect. On the other hand, the rudder servomotor may be caused to operate even when the rate of turn of the craft is correct, if the aircraft is lagging or leading the pick-off in azimuth.

In accordance with the present invention means are provided for stabilizing the turn rate of the craft to correspond with a predetermined or desired rate of turn.

The invention is based on the principle of measuring, with the aid of the azimuth reference, the rate at which the aircraft is turning about its vertical axis, and causing a corrective operating signal whenever the measured rate departs from a desired or predetermined rate of turn.

Other features and structural details of the invention will be apparent from the following description when read in relation to the accompanying drawing which shows a single diagrammatic view and circuit diagram of the improved automatic pilot.

With reference to the drawing, an automatic pilot embodying the present inventive concepts is shown to include an azimuth reference in the form of a directional gyro indicated at 10. The vertical ring of the gyro 10 is shown as fixedly connected to the rotor of a selsyn device 11 which is energized from a suitable source of alternating current electrical energy. The output of device 11 is fed by way of leads 12, 13 and 14 to a second selsyn device indicated at 15 whose rotor is positioned by a shaft 16. The stators of devices 11 and 15 are fixed to the craft. Device 15 provides an electrical signal at leads 17, 18 upon turning of the craft about its vertical axis from the reference determined by the position of the rotor of device 11 held by the direction gyro 10. Devices 11 and 15 provide a pair of interconnected pick-offs having stator and rotor parts, one of whose rotor parts is fixed to the azimuth reference or directional gyro 10 and the other of whose rotor parts is movable relative to the first rotor part and to the craft. The pair of pick-offs provide a signal upon relative displacement of the rotor parts thereof from a position of agreement or null position.

The signal from the pair of pick-offs, as shown, is fed to a rudder servo amplifier 20 of a conventional type having a rate section indicated at 21 and a displacement section indicated at 22. Section 21 produces a signal corresponding to the rate of change of any signal appearing at leads 17, 18. The displacement section 22 has a separate input from leads 17, 18 provided by the parallel connected leads 23, 24. Both the displacement and rate signals are combined in section 22 and fed to a rudder servomotor 25 of a conventional type for controlling the operation of the rudder 26 or other steering means for turning the craft about its vertical axis.

The automatic pilot also includes a gyro vertical 27 or other vertical reference provided with a roll signal transmitter or pick-off 28 of conventional type connected to an aileron servo amplifier 30 having a rate section 31 and displacement section 32 similar to amplifier 20. In this instance, the combined rate and displacement signals from section 32 operate an aileron servomotor 33 to control the ailerons 34 of the craft so the same banks or rolls about its fore and aft axis until the signal from pick-off 28 is restored to null. In ordinary operation with the craft flying a straight course, any signal at 17, 18 is supplied to both the rate and displacement sections of the amplifier 20. Any signal from pick-off 28 is similarly applied to sections 31 and 32 of the aileron servo amplifier 30 to restore the craft to a level condition.

According to the invention, means are included in the improved automatic pilot for making stabilized turns including a follow-up amplifier 35 which is energized by a signal at leads 17, 18 by way of leads 36, 37 when the two position switch 38 is thrown to its dotted line position.

The output of amplifier 35 drives a motor generator set whose motor is indicated at 40 and whose generator is indicated at 41. The motor 40 or motive means driven by the signal at leads 17, 18 operates to turn the rotor of the selsyn device 15 by way of shaft 16 and reduction gearing 42. The motor and generator are excited from a common sourse of alternating current electrical energy by way of windings 43 and 44, respectively. The generator 41, as shown, feeds back a signal by way of winding 45 in a known manner to the amplifier 35 to make the rotational speed of the motor 40 proportional to the amplitude of the signal at leads 17, 18.

The follow-up amplifier 35 and motor-generator set provided cooperate to move the rotor of the pick-off 15 in a direction to reduce the signal at leads 17, 18 to null. Such movement occurs at a speed that is proportional to the actual rate that the craft is turning about its vertical axis relative to the directional or azimuth reference 10. This keeps the signal at leads 17, 18 very nearly zero as the craft turns. The amplifier 35 advantageously has a very high gain so that the motor 40 will operate on appearance of even a very small signal at the leads 17, 18. The generator 41 or other signal producing means provides a signal in accordance with the speed of operation of the motor 40 which is proportional to the actual rate of turn of the craft relative to the azimuth reference or directional gyro 10. Such signal, as shown, is provided by the output winding 46 of the generator 41, the same being fed to the section 22 of the amplifier 20 by way of leads 47, 48. In this instance, the rate section 21 of the amplifier 20 is bypassed.

When the automatic pilot is effective to turn the craft about its vertical axis, a manually settable rate of turn knob 50 is positioned by the pilot to the right or left of zero position which moves the arms of switch 38 to its dotted line position in the drawing by means of rod 51, cam follower 52 on rod 51 and cam 53. Knob 50 turns cam 53 by way of shaft 54. Switch 38 is normally maintained in its full line position in the drawing by means of spring 55.

Knob 50 is simultaneously effective to operate a center-tapped potentiometer 56 to provide a signal by way of low resistance resistors 57, 57' at output leads 58, 59 in series with the roll signal pick-off 28 in the circuit to the amplifier 30. The potentiometer 56 also provides a signal at such time to section 22 of the rudder servo amplifier 20 by way of leads 60, 61, in series with lead 47 of the output winding 46 of generator 41. In turn, the circuit to the displacement section 22 of rudder servomotor includes the manually settable signal means or potentiometer 56 and knob 50 and the signal means or generator 41 which are arranged in opposing relation. A low resistance potentiometer 62 is shown as situated across leads 47, 48 and across the winding 46 of generator 41. Potentiometer 62 may be set manually by knob 63 in accordance with the air speed of the craft. This provides a means for adjusting the proportion of the respective signals at leads 58, 59 and leads 60, 61 from potentiometer 56 to regulate the angle of bank and turn rate of the craft in accordance with air speed. The potentiometer 62 also modifies the turn rate effecting signal to section 22 from potentiometer 56 in accordance with the air speed of the craft.

In operation of the automatic pilot to turn the craft about its vertical axis at a desired rate, knob 50 is displaced from its central or zero position in accordance with the rate of turn desired. Knob 63 is set in accordance with the air speed of the craft. Switch 38 is moved to its dotted line position and signals are supplied to motor 25 and motor 33 as described from the potentiometer 56 by way of leads 60, 61 and 58, 59 respectively. The craft then rolls into a turn adjusted in accordance with the air speed of the craft. The movement about the fore and aft axis of the craft ceases when the signal at pick-off 28 becomes equal and opposite to the signal input from potentiometer 56 at leads 58, 59 so that the turn proceeds at a fixed bank angle. Initially, the steering means or rudder 26 is displaced due to the signal of potentiometer 56 at leads 60, 61 modified in accordance with potentiometer 62 to provide an input to section 22 of the rudder servo amplifier 20. As the craft turns about its vertical axis, a signal appears at 17, 18 causing motor 40 to operate in the manner described to move the movable part of the selsyn device 15 relative to the azimuth reference and provide a signal at the output winding 46 of the generator that is proportional to the speed of operation thereof. The interconnected pick-offs 11 and 15 of the actual turn rate measuring means of the improved automatic pilot provide a data transmitting means having two inputs and and output. The output of the data transmitting means is effective to operate the motive means constituted by electric motor 40 of the system. One of the inputs of the data transmitting means is provided by the azimuth reference 10 and the other input is provided by means such as shaft 16 connected to the rotor of pick-off 15. The means interconnecting the signal output of the actual rate of turn measuring means and the steering servomotor is a circuit connection therebetween that includes the generator output winding 46 and the potentiometer 62. The signal from winding 46 opposes the signal from the potentiometer 56 to servomotor 25 and causes the rudder to move toward a central position. When the output of generator 41 at winding 46 is exactly equal and opposite to the modified signal from potentiometer 56 at leads 60, 61 the aircraft is turning at exactly the rate set for the same by knob 50 and the rudder is central. Departures of the craft from the predetermined rate of turn results in either increased or decreased output at winding 46 of the generator, a consequent unbalance in the input to amplifier section 22 and resultant corrective rudder is applied.

The automatic pilot is consequently capable of causing the craft to make turns of predetermined rates at predetermined bank angles. If desired, the indicia at the turn knob 50 may be graduated in terms of bank angle or rate of turn or both. The potentiometer 62 permits adjustment of the ratio of the signals supplied to the rudder and aileron amplifiers from the turn knob 50, this ratio depending on the average air speed for which the turn control of the improved automatic pilot is intended.

In the improved automatic pilot, an off-on switch 64 may be provided which in an off position pulls the switch 38 to the dotted line position shown in the drawing. Motor 40 is consequently effective at such time to drive the follow-up system until a null signal appears at leads 17, 18. This automatically aligns the rotor parts of the pick-offs formed of devices 11 and 15 so that the switch 64 can be moved to an on position at any time.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. An aircraft automatic pilot having turn control means including a rudder servomotor, manually settable means for operating said servomotor with a signal to cause the craft to turn at a desired rate, an azimuth reference, a pair of interconnected pick-offs having stator and rotor parts providing a signal upon relative displacement of the respective rotor parts from positional agreement, the rotor part of the first pick-off being fixed to said reference and the rotor part of the second pick-off being movable relatively to the first rotor part and to the craft, motive means operatively connected to said second rotor pick-off part operable in accordance with the signal of said pair of pick-offs to move said second rotor pick-off part in a direction to reduce the signal of said pick-offs to null at a speed proportional to the actual rate that the craft is turning about its vertical axis, means for providing a signal in accordance with the speed of operation of said motive means, and means for feeding the signal of said last-named signal means to said rudder servomotor in opposition to the signal of said manually settable means.

2. An aircraft automatic pilot having turn control means including a rudder servomotor, an aileron servomotor, manually settable means for simultaneously operating said rudder servomotor and said aileron servomotor with separate signals to cause the craft to turn at a desired rate at a constant bank angle, an azimuth reference, a pair of interconnected electrical pick-offs having stator and rotor parts providing a signal upon relative displacement of the two rotor parts from positional agreement, the rotor part of the first pick-off being fixed to said reference and the rotor part of the second pick-off being movable relatively to the first rotor part and to the craft, an electric motor operatively connected to said second rotor pick-off part responsive to the signal of said pick-offs to move said second rotor pick-off part in a direction to reduce the signal of said pick-offs to null at a speed proportional to the actual rate that the craft is turning about its vertical axis, an electric generator driven by said motor providing a signal proportional to the speed of operation of said motor, and means for feeding the signal of said generator to said rudder servomotor in opposition to the signal of said manually settable means.

3. In an aircraft automatic pilot, turn control means including a steering servomotor, means for operating said steering servomotor to cause the craft to turn about its vertical axis, means for providing a measure of the actual rate of turn of the craft including an azimuth reference, a pair of interconnected pick-offs having stator and rotor parts providing a signal upon relative displacement of the rotor parts from positional agreement, the rotor part of one of the pick-offs being fixed to said reference and the rotor part of the other pick-off being movable relatively to the rotor part fixed to the reference, motive means operatively connected to said other rotor pick-off part responsive to the signal of said pair of pick-offs to move said other rotor pick-off part in a direction to reduce the signal of said pair of pick-offs to null at a speed proportional to the turn rate of the craft, means driven by said motive means for providing a signal proportional to the speed of operation of the motive means, and means interconnecting said driven signal means and said steering servomotor.

4. The combination in an aircraft automatic pilot of, a rudder servomotor, means for measuring the turn rate of the craft including an azimuth reference, a pair of interconnected pick-offs having stator and rotor parts providing a signal upon relative displacement of the rotor parts from positional agreement, the rotor part of one of the pick-offs being fixed to said reference and the rotor part of the other pick-off being movable relatively to the rotor part fixed to the reference, an electric motor drivably connected to said other rotor pick-off part responsive to the signal of said pair of pick-offs, a generator driven by said electric motor producing a turn rate measuring signal, and a circuit including said rudder servomotor and generator.

5. The combination claimed in claim 4 in which said circuit includes a potentiometer adjustable in accordance with the speed of the craft.

6. The combination in an aircraft automatic pilot of, a steering servomotor, means for measuring the actual turn rate of the craft including data transmitting means having two inputs and an output, motive means driven by the output of said data transmitting means, means driven by said motive means providing one of the inputs of the data transmitting means, an azimuth reference device providing the other input of the data transmitting means, second means driven by said motive means providing a signal proportional to the actual turn rate of the craft, and means interconnecting said second signal means and said steering servomotor.

7. The combination in an aircraft automatic pilot of, a steering servomotor, means for measuring the actual turn rate of the craft including data transmitting means having two inputs and an output, an electric motor energized by the output of said data transmitting means, means driven by said electric motor providing one of the inputs of the data transmitting means, an azimuth reference device providing the other input of the data transmitting means, a generator driven by said electric motor providing a signal proportional to the actual turn rate of the craft, and a circuit connecting said generator and steering servomotor.

8. The combination claimed in claim 7 in which the circuit includes means for adjusting the signal of said generator in accordance with the speed of the craft.

PERCY HALPERT.

REFERENCES CITED

The following references are of record in the file of this patent:

UNITED STATES PATENTS

| Number | Name | Date |
|---|---|---|
| 2,115,086 | Riggs | Apr. 26, 1938 |
| 2,162,862 | Protzen | June 20, 1939 |
| 2,190,390 | Thiry | Feb. 13, 1940 |
| 2,190,391 | Thiry | Feb. 13, 1940 |
| 2,415,430 | Frische et al. | Feb. 11, 1947 |
| 2,429,642 | Newton | Oct. 28, 1947 |
| 2,450,907 | Newton et al. | Oct. 12, 1948 |
| 2,464,629 | Young | Mar. 15, 1949 |
| 2,471,821 | Kutzler et al. | May 31, 1949 |